United States Patent [19]

Deshpande et al.

[11] Patent Number: 4,831,390

[45] Date of Patent: May 16, 1989

[54] BUBBLE JET PRINTING DEVICE WITH IMPROVED PRINTHEAD HEAT CONTROL

[75] Inventors: Narayan V. Deshpande, Penfield; Dale R. Ims, Webster; Herman A. Hermanson, Penfield; Gary A. Kneezel; Roger G. Markham, both of Webster, all of N.Y.

[73] Assignee: Xerox Corporation, Stamford, Conn.

[21] Appl. No.: 144,213

[22] Filed: Jan. 15, 1988

[51] Int. Cl.[4] .............................................. G01D 15/16

[52] U.S. Cl. ................................. 346/140 R; 361/386

[58] Field of Search ......................... 346/140, 76 P H; 361/386, 387, 388, 389

[56] References Cited

U.S. PATENT DOCUMENTS

| | | | |
|---|---|---|---|
| 4,345,262 | 8/1982 | Shirato | 346/140 |
| 4,429,321 | 1/1984 | Matsumoto | 346/140 |
| 4,496,824 | 1/1985 | Kawai et al. | 219/216 |
| 4,571,599 | 2/1986 | Rezanka | 346/140 R |
| 4,601,777 | 7/1986 | Hawkins et al. | 156/626 |
| 4,636,812 | 1/1987 | Bakewell | 346/76 PH |
| 4,707,763 | 11/1987 | Kudo | 361/386 |
| 4,729,061 | 3/1988 | Brown | 361/386 |

*Primary Examiner*—Joseph W. Hartary

[57] ABSTRACT

A bubble jet printing device is optimized for extended operation by preventing heat buildup within the printhead and ink supply. Several configurations provides for the addition of heat sinks of appropriate dimensions either directly to the printhead or to an electrode board bonded to the printhead. Plated holes through the electrode board increase heat flow away from the printhead. According to another aspect of the invention, the ink supply cartridge has thermally conductive particles dispersed therethrough to effectively increase its capacity to radiate heat away from the printhead.

2 Claims, 6 Drawing Sheets

HEAD TEMPERATURE RISE VS TIME

BUBBLE JET PRINTING DEVICE WITH IMPROVED PRINTHEAD HEAT CONTROL

BACKGROUND AND INFORMATION DISCLOSURE STATEMENT

The invention relates to bubble jet printing system and, more particularly to a printhead which is constructed so as to effectively control heat generated during the printing operation.

Bubble jet printing is a drop-on-demand type of ink jet printing which uses thermal energy to produce a vapor bubble in an ink-filled channel that expels a droplet. A thermal energy generator, usually a resistor, is located in the channels near the nozzle a predetermined distance therefrom. The resistors are individually addressed with a current pulse to momentarily vaporize the ink and form a bubble which expels an ink droplet. As the bubble grows, the ink is ejected from the nozzle and is contained by the surface tension of the ink as a meniscus. As the bubble begins to collapse, the ink still in the channel between the nozzle and bubble starts to move towards the collapsing bubble, causing a volumetric contraction of the ink at the nozzle and resulting in the separting of the bulging ink as a droplet. The acceleration of the ink out of the nozzle while the bubble is growing provides the momentum and velocity of the droplet in a substantially straight line direction towards a recording medium, such as paper.

A problem with prior art printhead operation is the increase in temperature experienced by a printhead during an operational mode. With continued operation, the printhead begins to heat up, and the diameter of the ink droplet begins to increase resulting in excessive drop overlap on the recording media thereby degrading image quality. As the printhead experiences a further heat buildup, the ink temperature may rise to a point where air ingestion at the nozzle halts drop formation completely.

Various techiques are known in the prior art to control this heat buildup and maintain the printhead within a reasonable operating temperature range. U.S. Pat. No. 4,496,824 to Kawai et al discloses a thermal printer which includes circuitry to measure printhead temperature, compare the temperature to values representing a desired temperature range and reduce the printhead temperature by activation of a cooling mechanism.

In. U.S. Pat. No. 4,636,812, to Bakewell, a heater and heat sensor operate in combination with a temperature regulator to maintain the printhead at a predetermined temperature.

U.S. Pat. No. 4,571,598 discloses a thermal printhead in which a heat sink and ceramic substrate are connected to heating elements formed on the substrate surface.

These prior art heat management techniques may not be suitable for some printing systems depending on factors such as print head geometry, print speed etc. The present invention is directed towards an ink jet printer which has been modified so as to be optimized for heat management by incorporating heat dissapating elements into the printhead structure. The various heat flow paths taken by heat generated during printhead operation suggested certain modifications which were made to cartridge- type printhead assemblies to enhance heat flow away from the printhead. These modifications include placing heat sink members at optimum locations on both printhead and electrode boards bonded to the printhead. Another modification was the provision of plating holes placed through the electrode board and terminating against the printhead. In a still further embodiment, the heat-dissipating properties of the printhead cartridge were increased by metallizing the body of the cartridge and by adding a heat sink member to the cartridge surface. More particularly, the invention is directed, in a first embodiment to an ink jet printing device for a drop-on-demand thermal ink jet printer, the printing device which includes an ink supply cartridge having a printhead mounted within the cartridge, said printhead being of the type having a plurality of parallel channels, each channel being supplied with ink and having one open end which serves as an ink droplet ejecting nozzle, a heating element being positioned in each channel a predetermined distance from the nozzle, ink droplets being ejected from the nozzles by the selective application of current pulses to the heating elements in response to digitized data signals received by the printing device, the heating elements transferring thermal energy to the ink in contact therewith causing the formation and collapse of temporary vapor bubbles that expel the ink droplets, said print device further comprising an electrode board bonded to said printhead, said electrode board including at least one heat dissipating mechanism.

DESCRIPTION OF THE INVENTION

Figure 1:
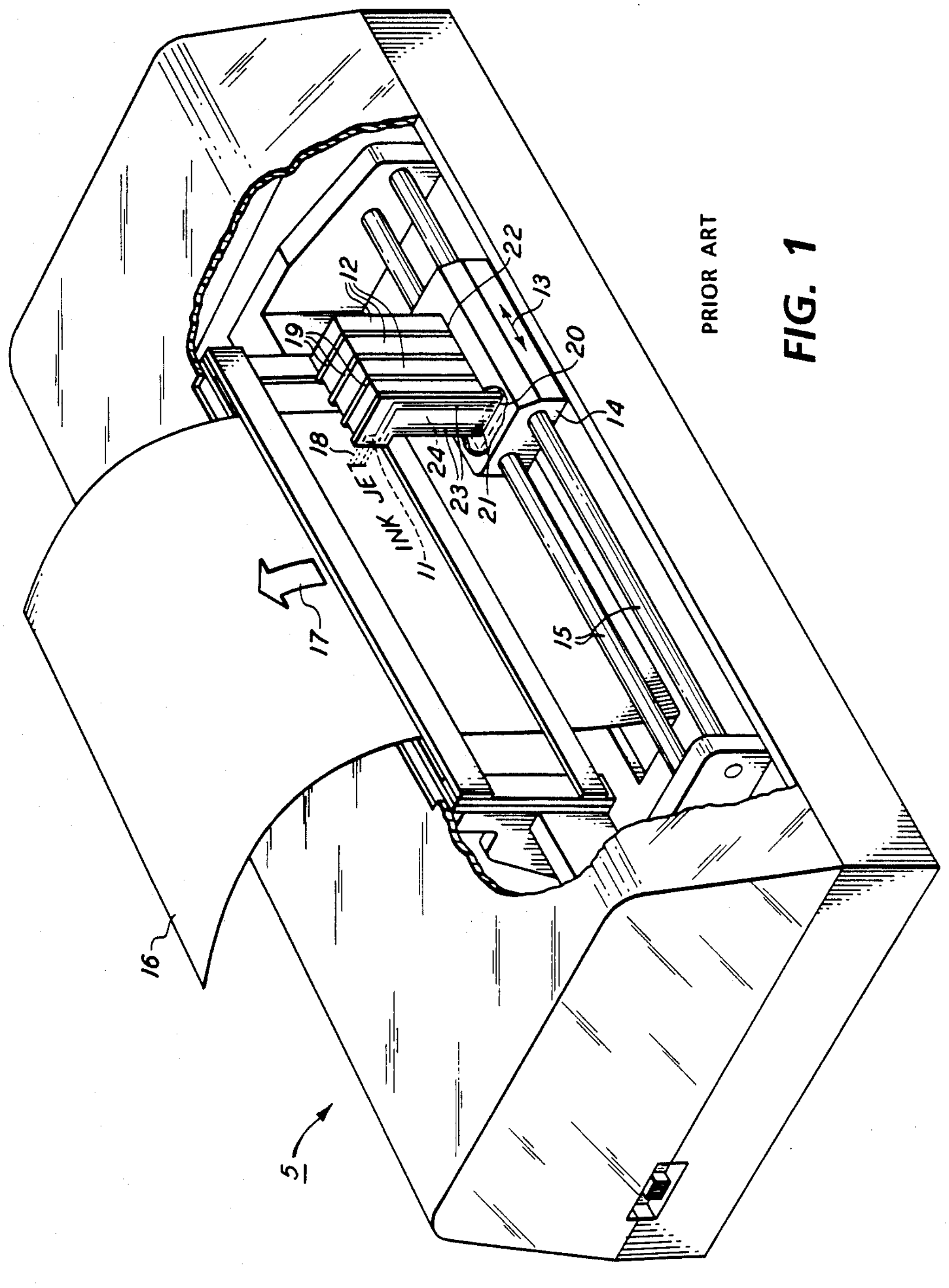
PRIOR ART FIG. 1
FIG. 1 is a schematic isometric view of a prior art thermal ink jet printing system.

A prior art, carriage type, multicolor, thermal ink jet printing device 5 is shown in FIG. 1. This device is described in detail in U.S. Pat. No. 4,601,777 whose contents are hereby incorporated by reference. Briefly however, a linear array of ink droplet producing channels is housed in each printhead 11 of each ink supply cartridge 12. One or more ink supply cartridges are mounted on a reciprocating carriage assembly 14 which reciprocates back and forth in the direction of arrow 13 on guide rails 15. The channels terminate with orifices or nozzles aligned perpendicular to the carriage reciprocating direction and parallel to the stepping direction of the recording medium which is stepped by the printing device a distance equal to the printed swath in the direction of arrow 17 and then the printhead moves in the opposite direction printing another swath of information. Droplets 18 are expelled and propelled to the recording medium from the nozzles in response to digital data signals received by the printing device controller (not shown), which in turn selectively addresses the individual heating elements, located in the printhead channels a predetermined distance from the nozzles with a current pulse. The current pulses passing through the printhead heating elements vaporize the ink contacting the heating elements ad produce temporary vapor bubbles to expel droplets of ink from the nozzles. Alternatively, several printheads may be accurately juxatpositioned to form a page width array of nozzles. In this configuration (not shown), the nozzles are stationary and the paper moves past the nozzles.

In FIG. 1, several ink supply cartridge 12 and fixedly mounted electrode boards or daughter boards 19 are shown in which, sandwiched therebetween, are printheads 11, one of which is shown in dashed line. The printhead is permanently attached to electrode board 19 and their respective electrodes are wire-bonded together. A printhead fill hole 25, shown in FIG. 2, is sealing positioned against and coincident with an aperture (not shown) in the cartridge, so that ink from the cartridge is continuously supplied in the ink channels via the manfold during operation of the printing device.

Figure 2:
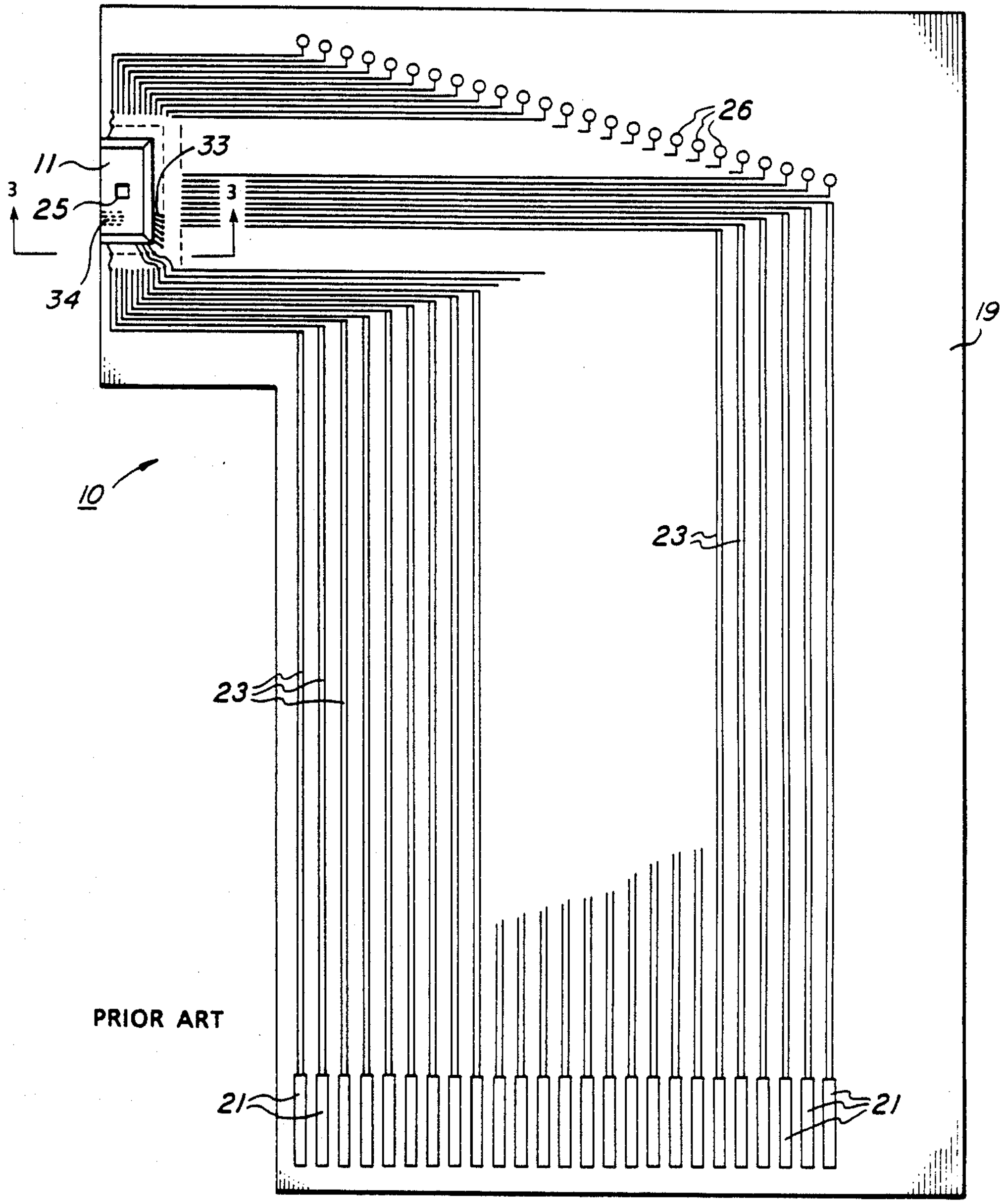
FIG. 2 is a plan view of the printing device shown in FIG. 1.

A plan view of an electrode board 19 and printhead 11 is shown in FIG. 2. The electrode board electrodes 23 are on a one-to-one ratio with the electrodes 33 of the printhead and are wired-bonded thereto. The electrodes on the opposite side of the board are electrically connected at locations 26. Electrode 33 are connected to individual heating resistors 34 within the printhead, several of which are shown as dotted lines. Each resistor 34 is associated with a droplet emitting nozzle. Further details on the fabrication and the printhead are disclosed in U.S. Pat. No. 4,601,777 supra.

Figure 3:
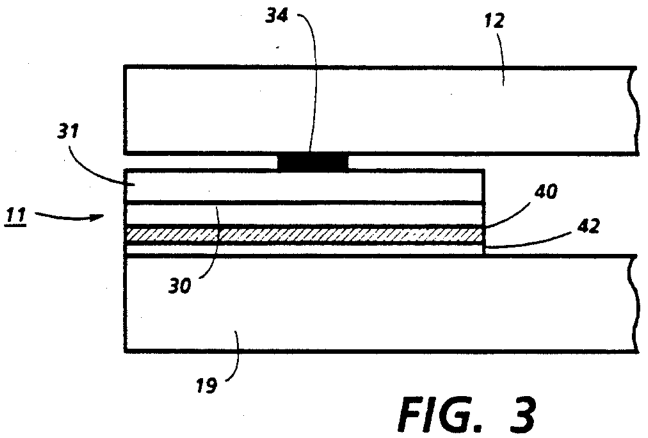
FIG. 3 is a partial cross-sectional view of the printing device in FIG. 2.

FIG. 3 is a cross-sectional view of the printhead 11 and a portion of electrode board 19. The view also shows a partial cross-sectional view of cartridge 12. Printhead 11 includes a heater chip 30 which contains the individual heating resistors and ink channel plate 31. The printhead is connected to the electrode board 19 via an epoxy layer 40 and copper pad 42. Gasket 34 seals the printhead to the cartridge 12. For this configuration, about 8 watts of power are necessary to bring the heating resistors to the desired nucleation temperature. A pulse duration of 2 to 5 microseconds can be used and a pulse frequency of 2 KHz or more is necessary depending upon process speed. A 48 element printhead would, for example, require an average power input of 2 to 3 watts to produce a stream of drops necessary for a solid area image formation. With continued operation, the printhead begins to heat up causing rise in ink temperature and an increase in the diameter of the ink spot being produced. Some form of heat management must therefore by employed to direct the heat buildup away from the print head.

Figure 4:
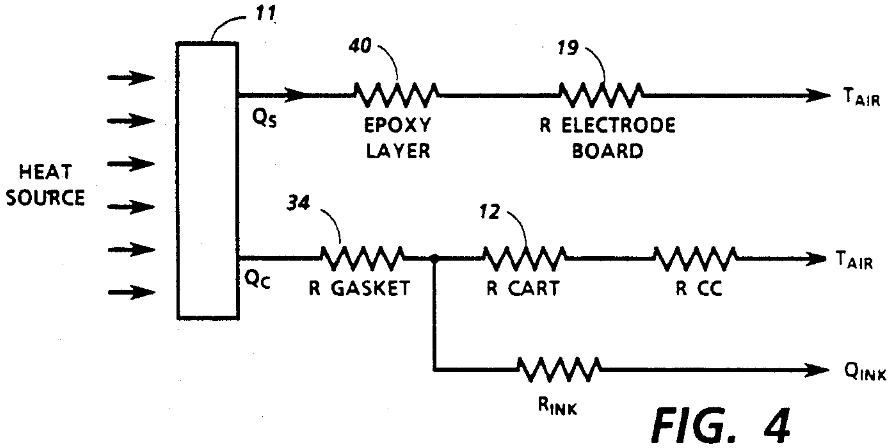
FIG. 4 is an equivalent circuit for the printing device of FIG. 3.

FIG. 4 is an equivalent circuit for the heat flow of the FIG. 3 embodiment. As seen, the heat generated in the printhead 11 is dissipated along three routes; the electrode board 19, the cartridge 12 and the ink. Each of the elements making up the assembly of FIG. 4 offer thermal resistance to heat flow. The resistance, R, is defined as $$R=T/Q=l/kA\,°C./watt$$

where T is the change in temperature across the element, Q is the heat flowing through the element, 1 is the length over which the heat has to flow, A is the cross-sectional area across which the heat flows and k is the thermal conductivity of the material. The heat $Q_s$ lost to air is conducted through epoxy layer 40 (resistance about 2° C./watt) and the electrode board (resistance about 160° C./watt). It is understood that the epoxy layer 40 is selected for high thermal conductivity and is applied in a thin layer. The copper pad 42 has negligible resistance. From an analysis of this circuit, thermal heat dissipation can be improved by any mechanism which decreases thermal resistance in the heat path $Q_s$ or $Q_c$. Several modification to the FIG. 3 embodiment can be made to increase both values and these values are disclosed below.

Figure 5:
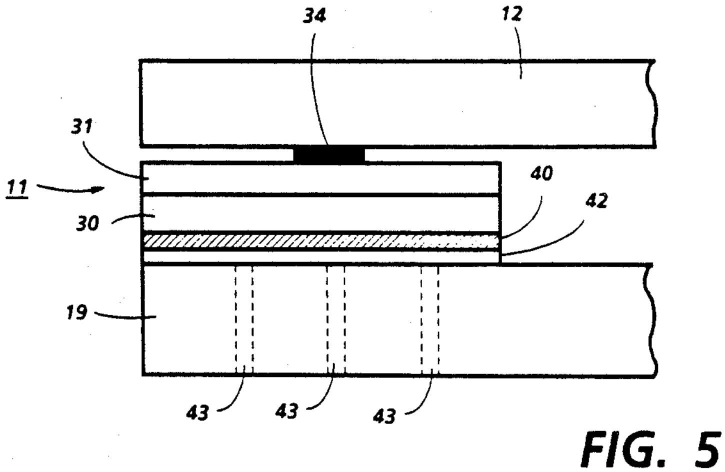
FIG. 5 is a partial cross-sectional view of the printing device of FIG. 3 modified, according to a first aspect of the invention, by forming heat conducting holes through the electrode board.

Referring now to FIG. 5, a plurality of plated through holes 43 have been formed through the body of electrode board 19. The plating in holes 43 serve to transfer heat by conduction away from chip 30 through the electrode board 19 thus reducing the resistance across the board. With holes of 0.4 mm diameter, the resistance to heat flow for each hole is about 70° C./watt.

Figure 6:
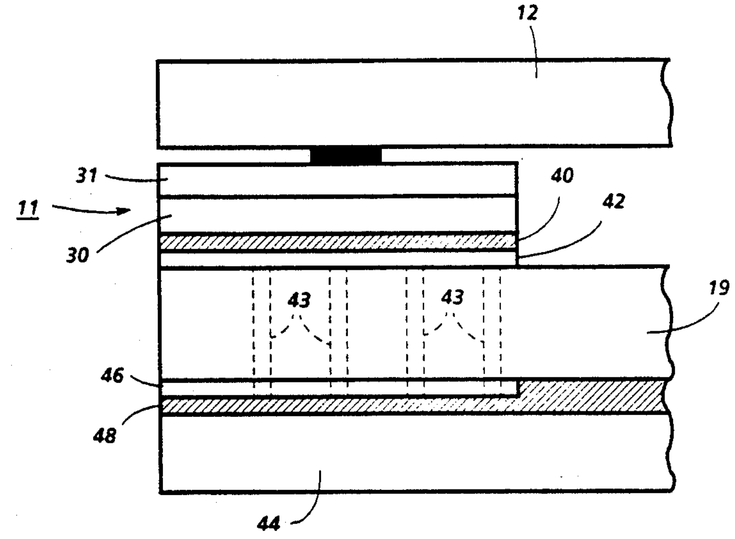
FIG. 6 is a partial cross-sectional view of the printing device in FIG. 5 modified, according to a second aspect of the invention, by adding a heatsink to the electrode board.
Figure 7:
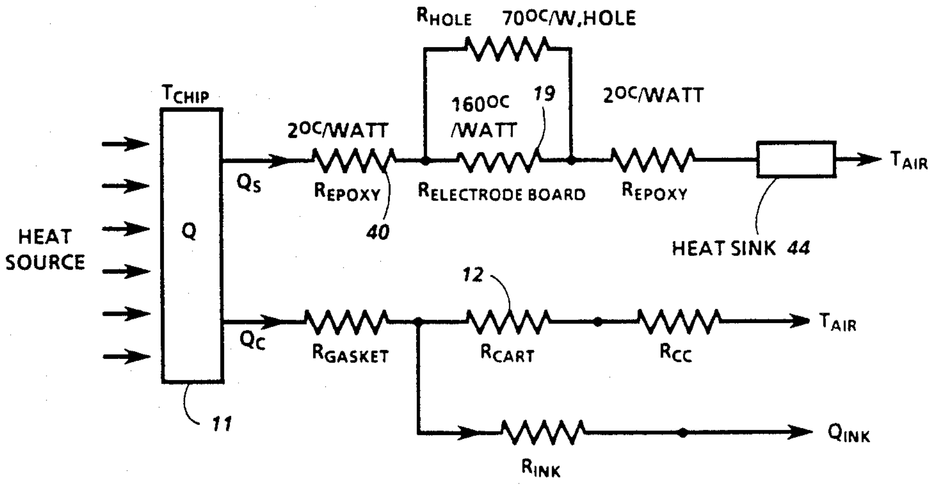
FIG. 7 is an equivalent circuit for the printing device of FIG. 6.
Figure 8:
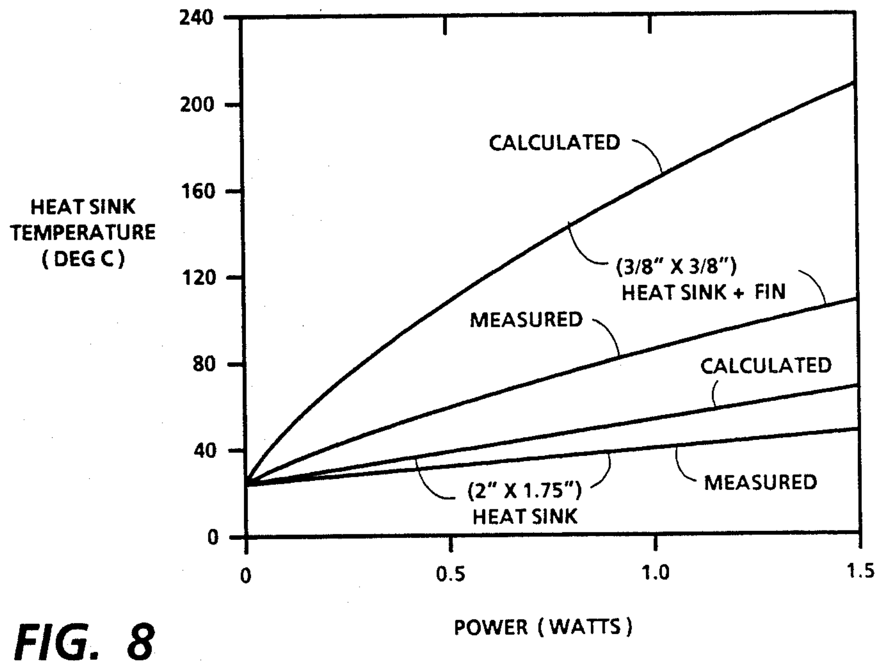
FIG. 8 is a graph showing measured and calculated values of printhead heat sink temperatures vs input power to the printhead.

FIG. 6 shows a further modification to the FIG. 5 structure which includes heat sink member 44 bonded to electrode board 19 via an copper pad 46 and epoxy layer 48. The equivalent circuit for this structure is shown in FIG. 7. Heat sink 44 spreads the heat over a larger area for effective dissipation to the ambient Heat is lost to the surrounding air through natural convection and radiation. The amount of heat lost from the heat sink 44 depends on the exposed surface area. Calculations have been made for two heat sink geometries: a $\frac{3}{8}$"×$\frac{3}{8}$" hat sink with a 5/16"×5/16" fin and a 2"×1.75" heat sink. FIG. 8 shows the temperature of the heat sink as a function of heat input to the heat sink. Also shown in that figure is the experimentally measured heat sink temperature for the two heat sink geometries.

The difference between the measured and calculated values is due to the heat flow $Q_c$ into the cartridge. Calculations only show the effect of $Q_s$, heat going into the sink. Comparing the experimental and theoretical values of heat sink temperature the partition $Q_s$ and $Q_c$ of the total heat input can be determined. The following table shows that comparable amounts of heat go into both the sink and the cartridge

| Heat Sink | % of Heat Into Cartridge | % of Heat Into the Heat Sink |
|---|---|---|
| $\frac{3}{8}$" × $\frac{3}{8}$" | 67 | 31 |
| 2" × 1.75" | 45 | 55 |

Analyzing the equivalent circuit of FIG. 7 and assuming a total of 15 plated holes 43 in parallel at 70° C./watt/hole, the resistance across the holes is about 5° C./watt compared to 160° C./watt without the plated holes. Thus, a temperature difference of from 8° to 10° C./watt will exist between the heat sink and the chip.

Figure 9:
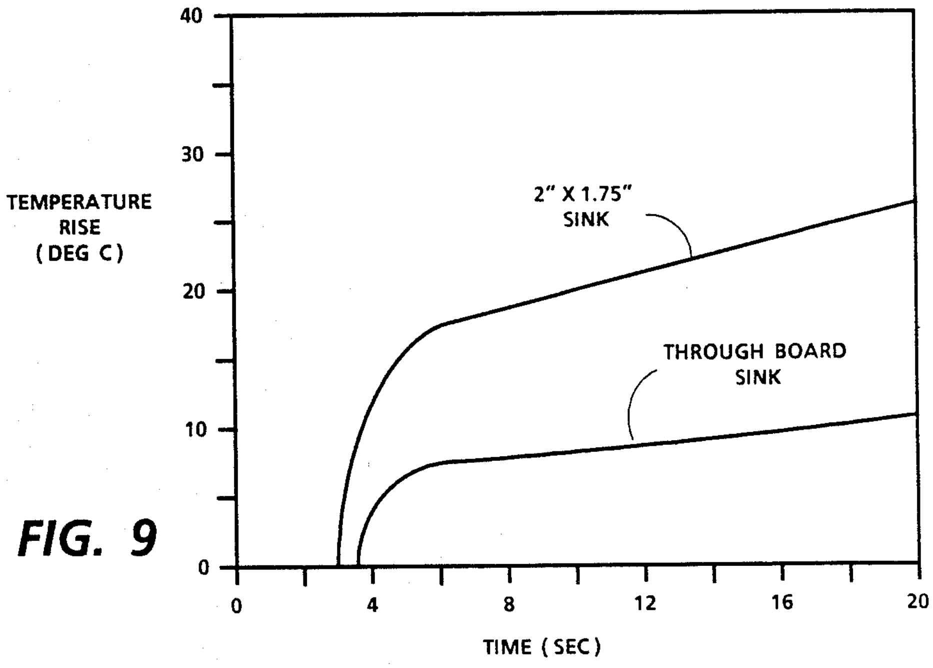
FIG. 9 is a graph showing head temperature rise as a function of time.
Figure 10:
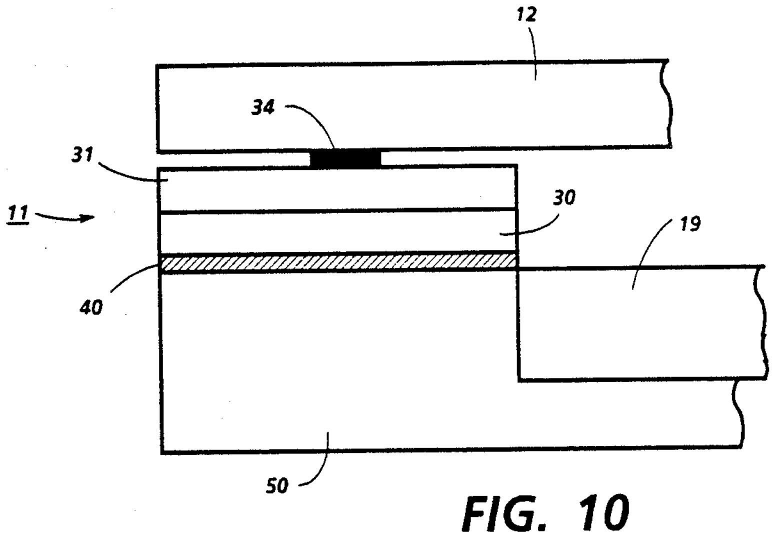
FIG. 10 is a partial cross-sectional view of the printing device of FIG. 3 modified, according to a third aspect of the invention, by adding a heat sink directly to the printhead.

FIG. 9 shows the chip temperature vs time at a certain power input for two types of heat sinks. The initial rise in temperature is the effect of thermal resistance between the chip and the heat sink. According to a still further aspect of the invention, this sharp initial rise can be reduced by attaching the heat sink directly to the printhead. This embodiment is shown in FIG. 10. Heat sink 50, having an exposed surface 52 of appropriate dimenions for this particular system is directly connected to the printhead 11 with epoxy layer 40. This configuration reduces the temperature difference between printhead and heat sink from 8° to 10° C./watt to about 2° C./watt which is the resistance of epoxy layer 40.

Figure 11:
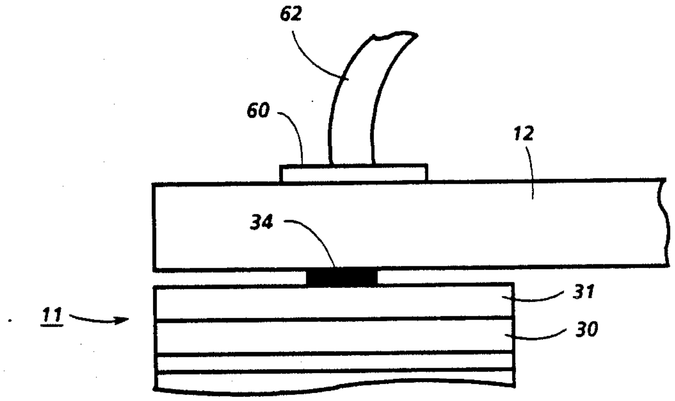
FIG. 11 is a partial cross-sectional view of the printing device of FIG. 3 modified, according to a fourth aspect of the invention, by adding a heat sink to the cartridge.

The above modifications to the basic print device 10 of FIG. 2 have served to augment the value of $Q_s$ creating an enhanced heat flow away from print head and into air. Improvements in heat flow have also been determined to be possible in the $Q_c$ leg of the FIG. 4 equivalent circuit. In the circuit, $R_{cc}$ is the resistence to convective heat loss from the cartridge to the air. The cartridge with its resultant $R_{CART}$ acts as an effective heat sink or heat dissipater through convection. The effectiveness can be enhanced by decreasing the resistance. One method is to add particles of a thermally conductive material such as a ceramic (e.g. alumina or alumium nitride) or metals such as powdered aluminum into the plastic metal used during cartridge formation. Another way is to add a heat sink member directly onto the cartridge surface as shown in FIG. 11. For this embodiment, heat sink 60 is bonded to the surface of cartridge 12. Metal clamp 62, used to hold the cartridge in place, will also enhance the conduction of heat away from sink 60. A good thermal contact between the clamp on the heat sink must be made.

While the invention has been described with reference to the structure disclosed, it is not confined to the details set forth, but is intended to cover such modifications or changes as may come within the scope of the following claims:

What is claimed:

1. An ink jet printing device for a drop-on-demand thermal ink jet printer, the printing device which includes an ink supply cartridge having a printhead mounted within the cartridge, said printhead being of the type having a plurality of parallel channels, each channel being supplied with ink and having one open end which serves as an ink droplet ejecting nozzle, a heating element being positioned in each channel a predetermined distance from the nozzle, ink droplets being ejected from the nozzles by the selective application of current pulses to the heating elements in response to digitized data signals received by the printing device, the heating elements transferring thermal energy to the ink in contact therewith causing the formation and collapse of temporary vapor bubbles that expel the ink droplets, said print device further comprising an electrode board bonded to said printhead, said electrode board including a heat sink member bonded to the electrode board surface, said heat sink having a surface exposed to the ambient and wherein said electrode board has a plurality of plated holes extending therethrough in thermal communication with the printhead and the heat sink member.

2. The ink jet printing device of claim 1 wherein said ink supply cartridge is of plastic construction having discrete thermally conductive particles distributed therethrough.

* * * * *